June 23, 1925.   1,543,167
G. KORTGARDNER, JR
SCRAPER
Filed Aug. 1, 1924   2 Sheets-Sheet 2
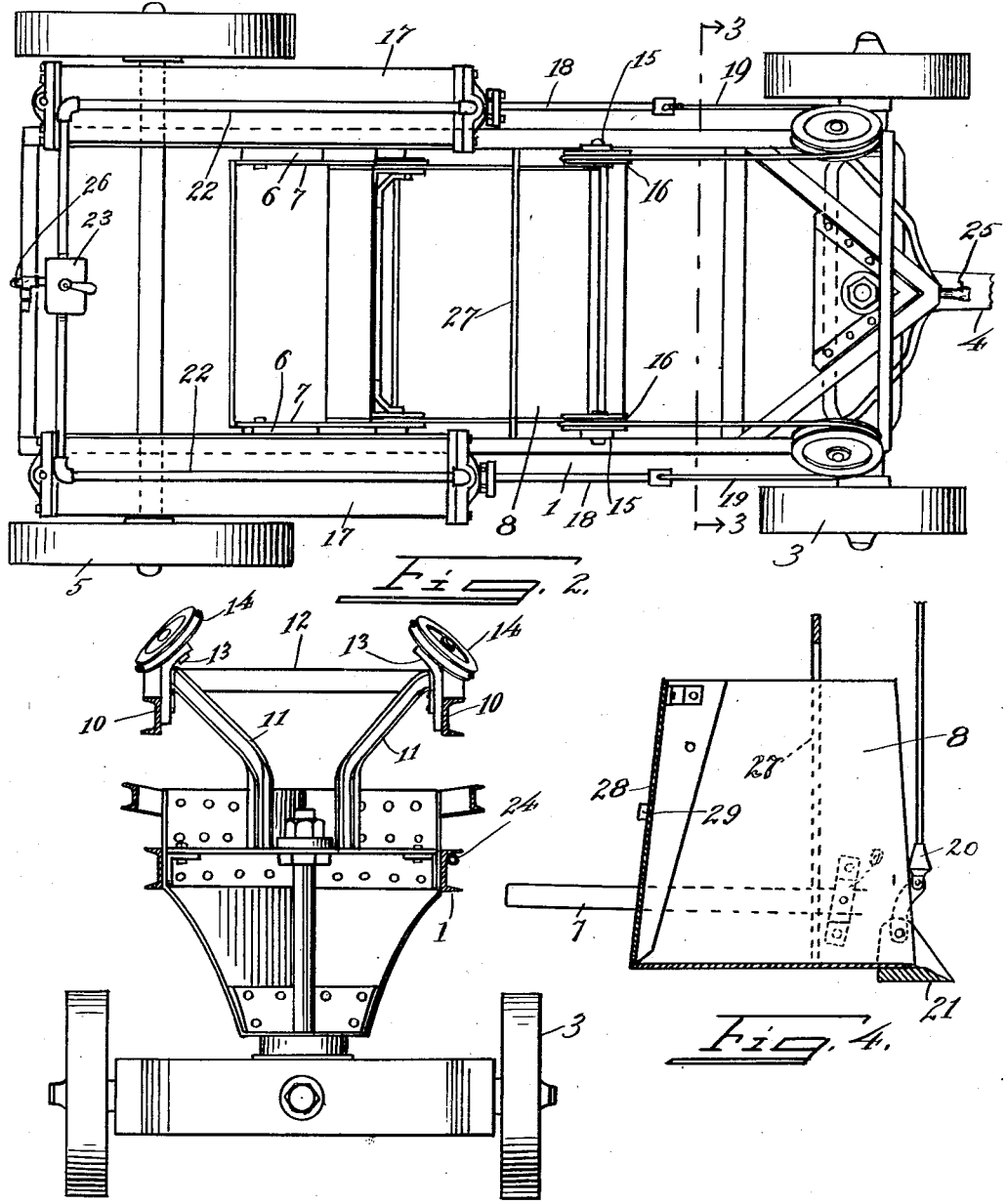
INVENTOR:
George Kortgardner, Jr.
BY Arthur H. Ewald,
ATTORNEY.

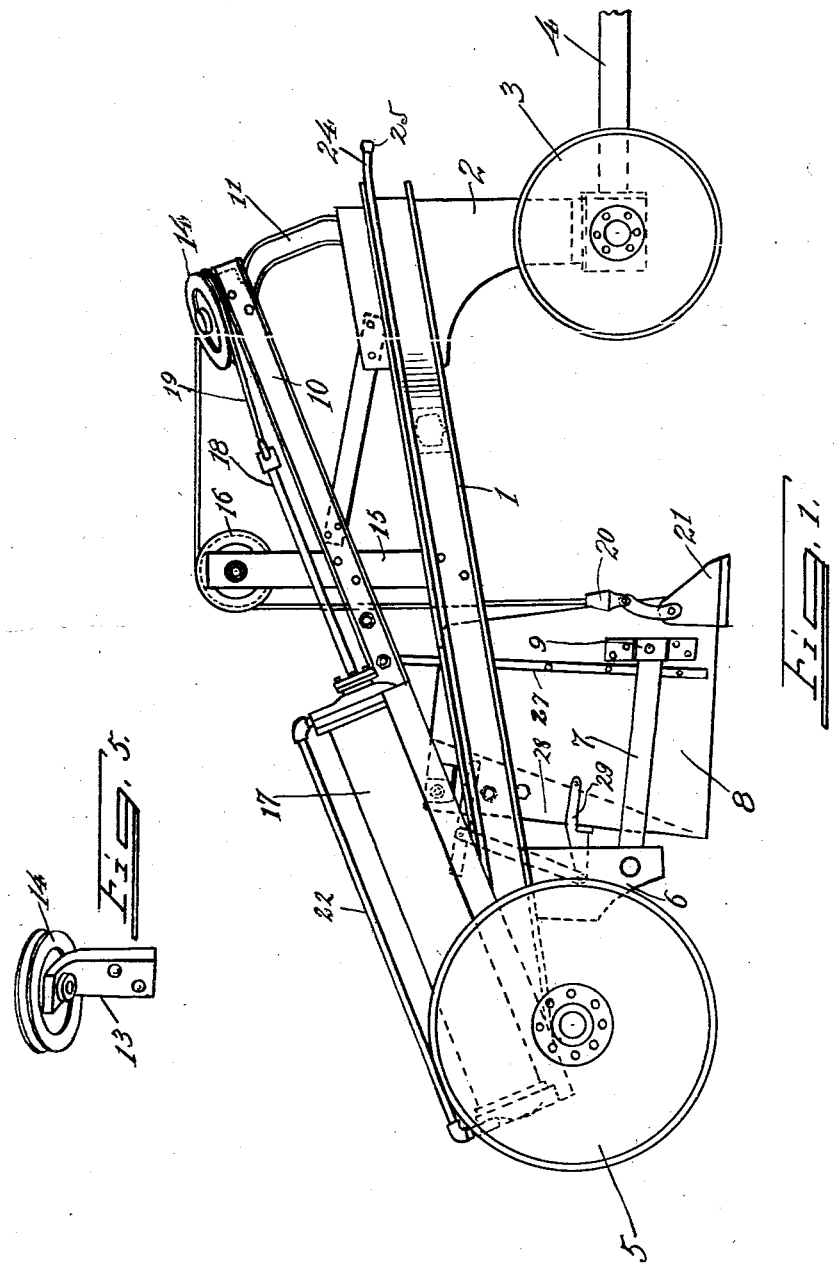

Patented June 23, 1925.

1,543,167

UNITED STATES PATENT OFFICE.

GEORGE KORTGARDNER, JR., OF CINCINNATI, OHIO, ASSIGNOR TO THE KORTGARDNER TRUCKING COMPANY, A CORPORATION OF OHIO.

SCRAPER.

Application filed August 1, 1924. Serial No. 729,629.

*To all whom it may concern:*

Be it known that I, GEORGE KORTGARDNER, Jr., a citizen of the United States, and resident of Cincinnati, in the county of Hamilton and State of Ohio, have invented certain new and useful Improvements in Scrapers, of which the following is a full, clear, and exact description, reference being had to the accompanying drawings, forming a part of this specification.

My invention relates to scrapers, and has particular reference to the four-wheel scraper adapted to be operated either singly or in trains by means of a tractor.

The principal object of this device is to provide new and improved hoisting means whereby the scoop may be raised and lowered expeditiously.

Further objects of the invention will appear from the following detailed description thereof:

In the drawings:

Figure 1 is a side elevation of a scraper constructed in accordance with this invention.

Figure 2 is a plan view of the scraper.

Figure 3 is a section on line 3—3 of Figure 2.

Figure 4 is a vertical section of the scoop.

Figure 5 is a perspective of a detail.

The numeral 1 indicates the main frame members of a tractor constructed in accordance with this invention. Said frame is provided with a suitable truck 2 at the front end for the front guide wheels 3. A tongue 4 is secured to the front axle. The rear part of the frame is provided with bearings for the rear wheels 5. The frame 1 is provided with depending plates 6 to which arms 7 are pivotally secured. The scoop 8 of the scraper is provided with outside straps 9 to which the free ends of the arms 7 are pivotally secured, thus movably securing the scoop between the side frame members.

Secured to the rear portion of the frame 1 is the hoist frame 10, the side members of which diverge upwardly from the side members of the frame 1 as clearly shown in Figure 1 of the drawings. The front end of the frame 10 is supported by means of standards 11, and the frame 10 is cross-braced at the front by means of a bar 12. Rotatably mounted on brackets 13 above and at the front end of the frame 10 are oblique pulleys 14, one of such pulleys being arranged at each side of the frame, as clearly shown in Figures 2 and 3 of the drawings. Near the longitudinal center of the frames 1 and 10 are two standards 15, each of said standards being secured both to the side members 1 and 10. Mounted on the upper ends of said standards are vertical pulleys 16.

Mounted on the frame 10 are two air cylinders 17 of ordinary construction, to the free ends of the piston rods 18 of which, cables 19 are secured. Each of the cables 19 passes around one pair of the pulleys 14 and 16, and the free end thereof is secured by means of a leaded socket 20 to the bit 21, comprising the lower front portion of the scoop 8. The front lower portion of the scoop is thus connected at each side to one of the cables 19.

The numeral 22 indicates the air supply pipes to the cylinders, and 23 a manually operated control valve. The supply pipe is continued around the frame, as shown at 24, and is provided with a connection 25 at the front end and a similar connection 26 at the rear end, so that the scraper may be connected to the air supply on the tractor, and also to other scrapers in a train in the usual manner.

The scoop 8 is provided with side guides 27 in the form of a bail, and also with a dump gate 28 secured by a latch construction 29, said elements being of ordinary construction.

The operation of the device will be apparent from the foregoing description to those skilled in the art to which the same appertains. When the scraper is secured to the tractor and the air supply connected the scoop is lowered by releasing the air in the cylinders 17. When it is desired to hoist the same so as to free the bit 21 or to dump the scoop, the air is admitted into the cylinders by the operation of the valve 23. It will be observed that a number of the scrapers may be connected up in a train and all supplied from one source of air pressure.

It will be further understood that various modifications in details of construction may be made without departing from the spirit and scope of my invention, as set forth in the appended claims.

Having thus fully described my invention, what I claim as new and desire to secure by Letters Patent is:

1. A scraper comprising a frame having two side members, a scoop movably mounted between said side members, a hoist frame having two side members, said side members diverging upwardly from said first mentioned frame from the rear to the front, oblique pulleys mounted in the front portion of the side members of said hoist frame, vertical pulleys mounted in said frames to the rear of said oblique pulleys, air cylinders mounted on said hoist frame, and cables secured to the piston rods of said air cylinders and arranged to operate over said pulleys, the free ends of said cables being secured to said scoop, whereby the operation of said cylinders is caused to hoist said scoop.

2. A scraper comprising a frame having two side members, a scoop movably mounted between said side members, a hoist frame having two side members, said side members diverging upwardly from said first mentioned frame from the rear to the front, oblique pulleys mounted in the front portion of the side members of said hoist frame, vertical pulleys mounted in said frames to the rear of said oblique pulleys, air cylinders mounted on said hoist frame, cables secured to the piston rods of said air cylinders and arranged to operate over said pulleys, the free ends of said cables being secured to said scoop, whereby the operation of said cylinders is caused to hoist said scoop, and means whereby the cylinders of a number of said scrapers may be operatively connected with a single source of air supply.

GEORGE KORTGARDNER, Jr.